June 11, 1940.    J. A. L. DETERS    2,203,984
INDICATING AND MEASURING INSTRUMENT
Filed Feb. 16, 1939
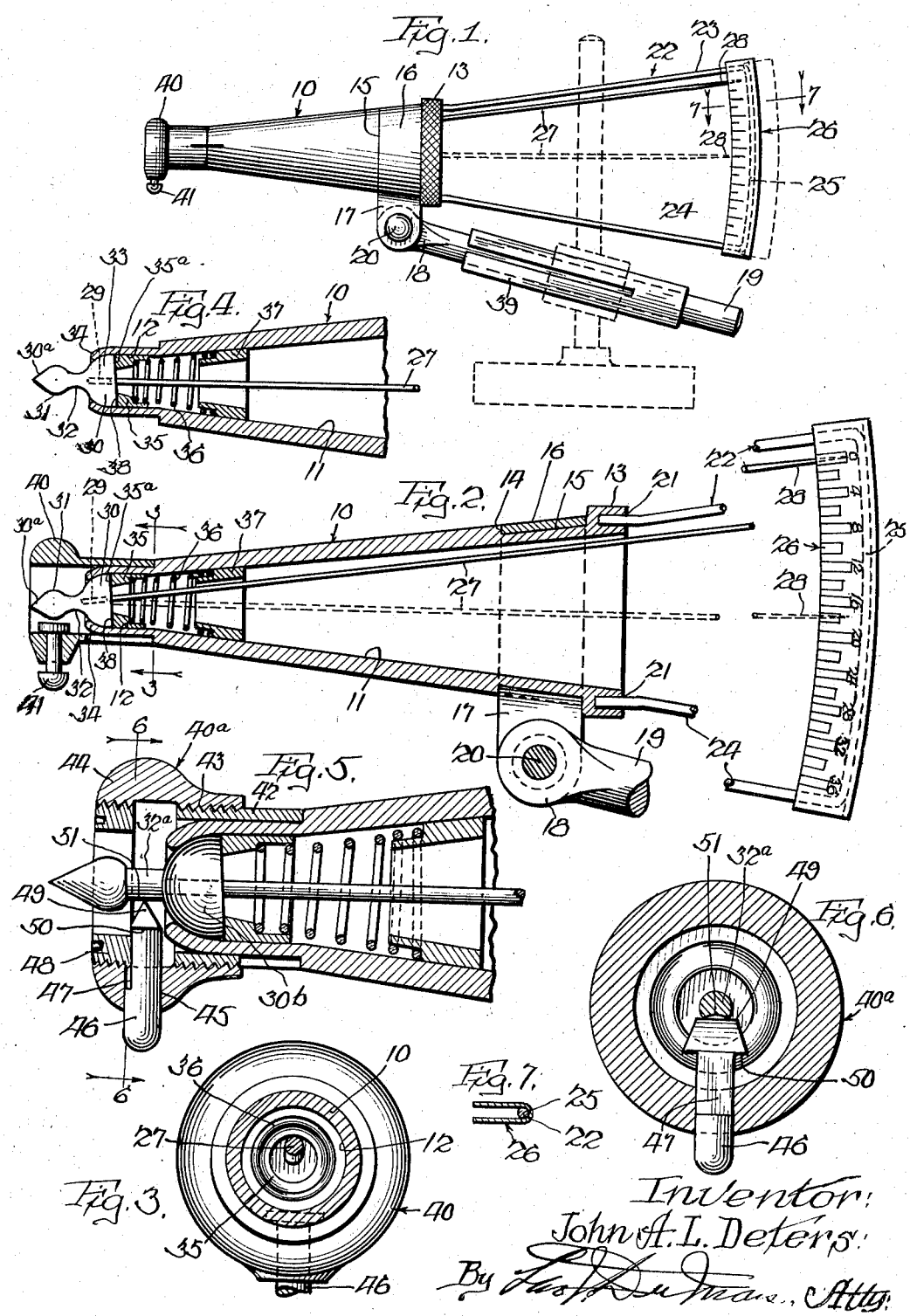

Patented June 11, 1940

2,203,984

UNITED STATES PATENT OFFICE 2,203,984

INDICATING AND MEASURING INSTRUMENT

John A. L. Deters, Chicago, Ill.

Application February 16, 1939, Serial No. 256,666

11 Claims. (Cl. 33—172)

The present invention relates to improvements in an indicating and measuring instrument, and is more particularly directed to a type to be used by skilled mechanics for obtaining the utmost accuracy in measuring work of any shape or size. The instrument is susceptible of use in many types of machines, such as lathes, milling machines, planers, grinders, etc., and may be used for bench work as a feeler gauge and in various other ways for detecting irregularities in surfaces of any shape.

The chief objects of the present invention are the provision of an indicating and measuring instrument which is very strong, durable, simple in construction and accurate in operation and constructed to be manually adjusted and regulated for various types of work, which instrument measures accurately while in any of its adjusted positions.

Another object is the provision of an instrument which may be readily attached to a machine or otherwise supported to be positioned in engagement with work to be measured or inspected for determining the irregularities in such work and to easily and readily sight the degree of irregularity of the work on the instrument.

A further object is the provision of an indicating and measuring instrument which may be bodily adjusted with respect to the work to be measured, and being constructed in a manner whereby the movements of the indicator thereof are multiplied many times with respect to its scale, to accurately denote the amount of inaccuracy of the work being inspected and measured.

And a further object is the provision of an instrument having an indicator coacting with a scale and with means yieldingly resisting the movements of the indicator, the indicator being arranged for manual adjustments with respect to the scale whereby the indicator may be positioned prior to its measuring movements and for various kinds of work.

A still further object is the provision of means permitting of manual bodily turning movements of the indicator for effecting the positioning thereof to an extreme outward position of the scale or to an intermediate position of the scale and whereby the restoring movements of the indicator will be to the position to which it is set; to provide an adaptor enclosing the work engaging end of the instrument for rendering the same operable and effective for accurate measuring when brought into engagement with work positioned at various angles thereto.

Referring to the drawing:

Figure 1 is a side elevation of my improved indicating and measuring instrument as attached to a standard indicated in dotted lines.

Figure 2 is an enlarged medial sectional view partly broken away, illustrating the operative parts of the instrument.

Figure 3 is an enlarged detail cross sectional view taken substantially on the line 3—3 of Figure 2.

Figure 4 is a medial sectional view of a portion of the instrument, illustrating the indicator as having been placed to center position.

Figure 5 is an enlarged partial medial sectional view of a modified form of adaptor used in connection with the instrument.

Figure 6 is a detail cross sectional view taken on the line 6—6 of Figure 5; and Figure 7 is a cross sectional view of the scale, taken on the line 7—7 of Figure 1.

The reference numeral 10 designates the body of the instrument which is preferably conical in shape, and which is provided with a longitudinally extending conical bore 11 terminating into a relatively straight bore 12 at one end thereof. The other end of the body 10 is provided with an enlarged knurled portion 13, and between this knurled portion 13 and a shoulder 14, the body is provided with an annular recess 15 around which a strap member 16 is positioned and which strap member terminates into a pair of ears 17 which straddle the end 18 of a rod 19, and which ears are secured by a bolt 20 to the end 18 of the rod. This strap member 16 offers a frictional tension to the turning movements of the body 10 and also a frictional tension to the swinging movements of the strap member 16 on the rod 19, so that the body 10 may be manually turned for adjustment by gripping the knurled portion 13 thereof, or the body 10 may be bodily rocked for adjustment on the rod 19.

The body 10 is provided in the end adjacent the knurled portion 13 thereof with diametrically opposed openings 21—21, (Fig. 2), into which the free ends of a bail or frame 22 are secured, and which bail or frame is formed to provide angularly disposed arms 23—24 at the top and bottom respectively, and which arms terminate into an integral arcuate formation 25 over which a scale 26 is positioned. The scale 26 is preferably of U-formation when viewed in cross section, Fig. 7, and is arced its entire length to correspond to the arcuate formation 25 of the bail or frame 22. The scale 26 is provided with graduations to denote the movements of an indicator 27 in thousands of an inch on each side face thereof, so as to be readable on both sides of the instrument.

The indicator 27 employed in connection with the scale consists of a relatively small and stiff spring wire which is tapered at its free end 28 and is received within the channel formation of the scale 25, and has its other end 29 imbedded and secured in a work contacting member 30, which has its free end preferably of a conical formation 30a providing an annular shoulder 31 and a reduced neck portion 32 terminating into a hemispherical portion 33. This hemispherical portion 33 engages and is rockably and turnably positioned in a coacting portion 34 of the body 10, and forms a ball and socket connection therewith at the free end of the straight bore 12.

The work contacting member 30 is yieldably retained in position in the body 10 by an assembly comprising a sleeve 35 having one end of a spring 36 secured thereto and with the other end of the spring secured to a tapered sleeve 37. The assembly surrounds the indicator 27 and the tapered sleeve 37 is driven into frictional engagement with the conical bore 11 in the body 10 to yieldingly retain the end 35a of the sleeve 35 in engagement with the face 38 of the work contacting member 30 by means of the spring 36. With this assembly in position, the spring 36 urges the sleeve 35 in the straight bore 12 to effect an even pressure against the face 38 of the member 30 and retains the same in the coacting portion 34. The coacting face 38 of the work contacting member 30 and the end 35a of the sleeve 35 are disposed at a slight corresponding angle, whereby a bodily turning movement of the member 30 will effect an inward sliding movement of the sleeve 35 against the spring 36 until the member 30 is turned approximately 180 degrees, and the tension of the spring will retain the member 30 in its adjusted position. This manual rotation of the member 30 is for effecting the positioning of the indicator 27 from full line position to dotted line position, Figs. 1 and 2.

The slight angle of the faces 35a and 38 determines the position of the indicator with respect to the scale and permits of ready adjustments of the indicator in accordance with the work being measured and inspected. The faces 35a and 38 being at such an angle that the indicator is in either extreme upper position or in intermediate position with respect to the scale.

While manually adjusting the indicator, the scale is moved to dotted line position Fig. 1, so that the turning movements of the work contacting member 30 will carry the indicator therewith and the scale being spaced therefrom will permit the free end 28 of the indicator to move in an arc until it has been turned 180 degrees from extreme outward position to center position or when restoring the same, from center position to outward position, and when set, the scale is replaced to accurately measure the work on which the instrument is used.

In the use of the instrument, it is often found necessary to apply the same to the rest of a lathe, etc., having a square opening therein and for this purpose, a friction member 39 is slidably positioned over the rod 19. This member 39 may be adjusted longitudinally of the rod and will also permit of a sidewise rocking movement of the instrument.

When the instrument is used for detecting and measuring openings in work, the conical formation 30a is employed, and when using the instrument for flat or curved work, or where the instrument is more easily handled on other kinds of work, an adaptor 40 is positioned over the work contacting member 30 to coact therewith. The adaptor is frictionally retained on the body 10 and has a headed pin 41 slidably positioned therein, which engages the annular shoulder 31 when brought into engagement with the work to be inspected and measured.

Assume now, that the instrument is supported with its rod 19 attached to a machine or support and the body 10 is rocked on the bolt 20 to bring the pin 41 in engagement with the work and by moving the work or moving the instrument, the pin will be moved substantially vertically to engage the member 30 and move the same with the indicator in accordance with the variations of the surface being measured.

In order to easily position the instrument with respect to the work, the body 10 may be rocked so that the pin 41 will be at a position to engage the work, then the body 10 may be bodily turned by gripping the knurled portion 13 thereof which will position pin 41 at an angle to the work and permit the instrument to be moved over the work and out of engagement therewith, until the desired position is reached and the body 10 may then be again turned to bring the pin 41 in engagement with the work.

The instrument will function accurately while tilted at a slight angle, the tilting being for the purpose of placing the scale where it may be easily seen and read.

In Figs. 5 and 6, a modified form of adaptor is illustrated. This adaptor 40a comprises a sleeve 42 provided with a threaded portion 43 to which an annular member 44 is threaded and which member is provided with a transverse bore 45 in which a pin 46 is positioned for sliding movements therein and with one end engaging the work while the adaptor is being used.

The pin 46 is relieved on one side thereof at 47 for engagement by a threaded ring 48 secured in the adaptor. The upper end of the pin 46 is provided with a transversely extending knife edge 49 which terminates into a shoulder 50 to prevent removal of the pin 46 from the adaptor. The knife edge 49 is brought in engagement with a slightly inwardly arced surface 51 of the neck portion 32a of the work contacting member 30b when the pin 46 is brought in engagement with the work. This construction permits of the accurate movements of the indicator while provided for a three point contacting member.

The instrument is indispensible in accurately locating openings in work, such as turning work on a lathe in which the center must be accurately located in order to produce a perfect concentric position of work. For this purpose the scale is manually moved to dotted line position Fig. 1, and the indicator 27 of the instrument is manually turned to center position, dotted lines Fig. 2, and the work contacting member 30 is then brought into position with its conical formation 30a in the center opening of the work. As the work is turned in the lathe, the indicator will be controlled thereby and any amount of variation out of center position will be indicated by the movement of the indicator with respect to the scale and the work may then be adjusted and the action repeated until the indicator remains in center position of the scale which indicates that the accurate center of the work has been located.

Should it be desirable to locate a position out of the accurate center of work, the work may then be positioned with the instrument in engagement therewith until the indicator of the instrument arrives at the dimension indicating the amount of offset desired from center position, and the work may then be firmly clamped into position and the hole therein accurately drilled to the amount of offset indicated on the instrument.

With this type of instrument very accurate measurements may be obtained, in that the movements of the work contacting member are relatively slight in comparison with the movements of the indicator with respect to the scale, thereby the amount of movement of the work contacting member will be multiplied several times, so as to be easily and readily read on the scale.

I claim:

1. An indicating and measuring instrument, comprising a hollow body having a scale supporting frame extending outwardly thereof, a scale frictionally held on the extreme end of said frame, an indicator rotatively and swingably carried by the hollow body, said indicator having one end thereof coacting with the scale and the other end thereof engageable by work to be measured, means in the hollow body engageable with and yieldingly resisting the movements of the indicator, said means comprising a ring slidably positioned in the body in engagement with the indicator, a tapered sleeve frictionally driven in the body, and a spring interposed between said ring and sleeve effecting a yielding tension on the indicator for yieldingly resisting the movements of the indicator.

2. An indicating and measuring instrument, comprising a hollow body having a scale supporting frame extending outwardly thereof, a scale frictionally held on the extreme end of said frame, an indicator rotatively and swingably carried by the hollow body, said indicator having one end thereof coacting with the scale and the other end thereof engageable by work to be measured, means in the hollow body including a spring yieldingly resisting movement of the indicator, said means having an angular face engageable with an angular face of the indicator whereby said indicator may be bodily turned with respect to the angular face of said means for adjusting the position of said indicator with respect to the scale.

3. The combination of claim 2 hereof in which the angular face of the indicator and the angular face of the said means being relatively flat for face to face engagement and at an angle whereby a turning movement of 180 degrees of the indicator positions said indicator from one end of the scale to a position intermediate its length.

4. An indicating and measuring instrument, comprising a body, a frame fixed to one end of the body and extending outwardly thereof, a scale frictionally held on the outward end of said frame, an indicator carried by the body and extending outwardly of both ends thereof, one of the ends of the indicator coacting with the scale and the other end of the indicator being engageable for effecting movement of the indicator, and means carried by the body coacting with and yieldingly resisting the movements of the indicator, said means having an angularly disposed surface coacting with an angularly disposed surface of the indicator whereby the turning movement of the indicator with respect to the coacting angularly disposed surface effects the positioning of the indicator with respect to the scale.

5. An indicating and measuring instrument, comprising a body having a scale thereon, an indicator including work engaging means carried by the body with the indicator coacting with said scale, the work engaging means being provided with a surface disposed angularly to the longitudinal axis thereof, a spring-urged member having a surface coacting with the surface of the work engaging means, said spring-urged member being movable longitudinally during a swinging movement of the indicator with respect to the scale and during manual turning movements of the work engaging means for adjusting the indicator with respect to the scale.

6. The combination of claim 5 hereof in which the scale is of U-shape in cross section and arced the entire length thereof whereby the indicator extends in the U-shaped portion and is movable therein, the scale being provided with indicia on both sides thereof to be readily readable on two sides of the instrument.

7. An indicating and measuring instrument, comprising a body having a socket formation at one end thereof, a frame fixed to the other end of the body, a U-shaped scale having indicia on both sides thereof and frictionally attached to the extreme end of said frame, an indicator having a hemispherical portion thereon and being pivotally carried in the socket of the body and extending outwardly of both ends thereof, one end of the indicator coacting with the scale and the other end of the indicator being engageable for effecting movement of the indicator, means carried by the body engaging the flat surface of the hemispherical portion for yieldingly retaining the indicator in the socket of the body, said means having an angularly disposed surface coacting with the flat surface of the hemispherical portion of the indicator, said surfaces being at an angle to the axis of the indicator whereby the indicator may swing in the socket of the body during measuring movements and which indicator may be bodily turned for effecting its positioning with respect to the scale.

8. An indicating and measuring instrument, comprising a body, a scale, a frame fixed to the body supporting the scale in spaced relation therewith, an indicator including an integral work engaging means carried by the body and with the indicator extending to and coacting with the scale, the work engaging means being provided adjacent the indicator with an angularly disposed surface with respect to the axial center of said indicator, a longitudinally movable spring-urged member having a companion surface corresponding to the surface of the work-engaging means, said spring-urged member yieldingly resisting the swinging movements of the indicator and restoring said indicator with the angularly disposed surface thereof in face to face relation with the companion surface of the spring-urged member.

9. An indicating and measuring instrument, comprising a body, a scale, a frame fixed to and extending outwardly of the body supporting the scale in spaced relation therewith, an indicator including an integral work engaging means carried by the body and with the indicator extending to and coacting with the scale, the work engaging means being provided adjacent the indicator with a diagonally disposed surface with respect to the axis of the indicator, a spring-urged member having a diagonally disposed companion surface normally in face to face relation with the diagonal surface of the work engaging means, said spring-urged member serving to restore said indicator when the surface of the work engaging means of the indicator has been moved out of face to face relation with the companion surface of the spring-urged member.

10. The combination of claim 9 hereof in which the diagonal surfaces of the work engaging means and of the spring-urged member provide for a turning movement of one with respect to the other whereby the turning movement of the work engaging means with respect to the spring-urged member positions the indicator from zero position to an intermediate position of the scale.

11. An indicating and measuring instrument, comprising a body including a frame extending outwardly of the body, an arcuate U-shaped scale having indicia on both sides thereof and being frictionally supported to be manually adjusted on the frame, an indicator means carried by the body and coacting with the scale, a portion of said indicator means being provided with a diagonally disposed surface, a spring-urged member having a diagonal surface normally in face to face relation with the diagonal surface of the indicator means, said surfaces serving to retain the indicator means in certain positions with respect to the scale, said scale being manually positioned on the frame out of the path of the indicator means when said indicator means is manually turned 180 degrees with respect to the spring-urged member for positioning the indicator means intermediate the length of the scale.

JOHN A. L. DETERS.